Figure 1:
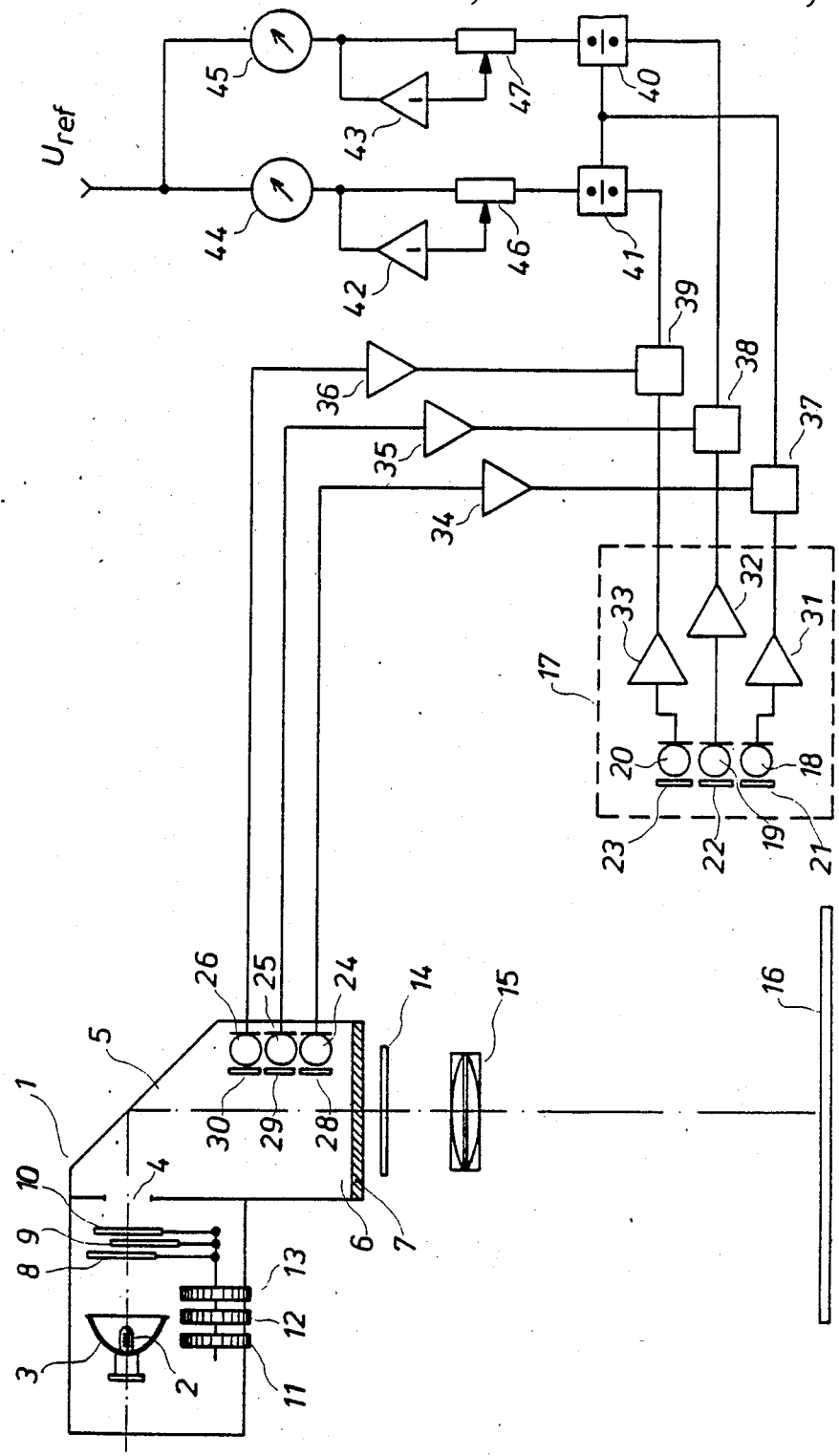

United States Patent [19]

Reiterer

[11] Patent Number: 4,678,319
[45] Date of Patent: Jul. 7, 1987

[54] MEASURING DEVICE FOR SELECTING THE FILTER IN PHOTOGRAPHIC ENLARGING OR COPYING APPARATUSES

[75] Inventor: Walther Reiterer, Vilpian, Italy
[73] Assignee: Durst Phototechnik GmbH, Bozen, Italy
[21] Appl. No.: 840,568
[22] PCT Filed: Jun. 7, 1985
[86] PCT No.: PCT/EP85/00274
§ 371 Date: Feb. 24, 1986
§ 102(e) Date: Feb. 24, 1986
[87] PCT Pub. No.: WO86/00149
PCT Pub. Date: Jan. 3, 1986

[30] Foreign Application Priority Data

Jun. 14, 1984 [IT] Italy ............................. 4837 A/84

[51] Int. Cl.⁴ .......................................... G03B 27/80
[52] U.S. Cl. ........................................ 355/38; 355/35
[58] Field of Search ............................. 355/38, 32, 35

[56] References Cited

U.S. PATENT DOCUMENTS 3,090,289  5/1963  Gundelfiner ........................ 95/73
3,647,296  3/1972  Long ................................... 355/38
3,672,768  6/1972  Schaub et al. ...................... 355/38
3,819,275  6/1974  Aimi et al. .......................... 356/175
4,492,457  1/1985  Kawada et al. ..................... 355/38

FOREIGN PATENT DOCUMENTS 2123968  2/1984  United Kingdom .

Primary Examiner—Monroe H. Hayes
Attorney, Agent, or Firm—Cahill, Sutton & Thomas

[57] ABSTRACT

A measuring device for selecting the color composition of the copying light when copying a film frame original in a photographic enlarging or copying apparatus has two groups of red-, green- and blue-sensitized measuring cells of which one group receives measuring light entering into the film frame original and the other group receives measuring light coming out of the film frame original. The measuring signals of each color from both groups of measuring cells are combined with one another and from the combination signals, ratios are formed of the color parts with respect to one another. As a result of the combination of measuring signals of the copying light before and after the flow through the film frame original to be copied, an undercompensation of the color deviation of individual originals with respect to a reference original is achieved.

5 Claims, 1 Drawing Figure

MEASURING DEVICE FOR SELECTING THE FILTER IN PHOTOGRAPHIC ENLARGING OR COPYING APPARATUSES

TECHNICAL FIELD

In general, this invention relates to the field of color exposure of photographic film bases when producing copies of a film original. In particular, this invention relates to a measuring device for selecting the color composition of the copying light in the case of color exposures in photographic enlarging or copying apparatuses.

When making colored enlargements or colored copies of a film frame original, it is normally necessary for obtaining a correct color reproduction to adapt the copying light with respect to color to the original to be copied. A change in the color composition of the original essentially white light of the enlarging or copying apparatus is caused, for example, by the introduction of subtractive color filters into the path of the rays resulting, depending on the depth of introduction, in a larger or smaller effect on the copying light. In order to determine the type and extent of the required filtering, light measuring apparatuses are used frequently by means of which each film frame original to be copied is measured before the copying in regard to its density and color distribution.

STATE OF THE ART

An apparatus for the selection of filters is known, for example, from U.S. Pat. No. 3,819,275. This apparatus has three photocells sensitized in the colors red, green and blue that generate light-intensity-dependent measuring signals for each of the color components red, green and blue of the copying light. From the measuring signals, the ratio of the parts of two primary colors to the part of the third primary color is determined in a computer unit. Finally, the determined ratios are compared with preset reference values and possible deviations are indicated by an indicating device.

When a light measuring apparatus of this type for determining the required filtering is used in practice, a calibration of the apparatus is first carried out relative to a selected reference original for which in a preceding test series the exposure time and filtering for an optimal reproduction were determined. For this purpose, the enlarging apparatus is brought into the basic setting that was previously determined for the reference original and the light coming out of the reference original in the case of this adjustment is measured in the three basic colors. The measured values as reference values for the film frame originals to be copied continuously are stored in the measuring apparatus. Each of the originals to be copied continuously, before the actual exposure, is measured in the same way and the respective adjusted filtering is followed so long that the indicated measured values correspond to the stored values relating to the reference original.

The described method of operation has the objective of creating the color balance existing in the reference original, by means of the corresponding color filtering of the copying light, also in the case of all other originals to be copied. This process is based on the principle of the so-called "integration on gray" according to which the colors contained in one photograph integrate over the whole picture surface into a neutral gray because the taken picture scene typically contains the same proportions of the three basic colors. Based on this principle, a constant color balance is maintained in the color copies if care is taken that the copying light coming from the individual film frame originals has a constant ratio of the basic color parts.

However, the prescribed method of operation leads to unsatisfactory results when an original has dominant colors. In such a case, because of the complete balancing of the deviation from the neutral gray by means of the filtering a cast in the picture copy is obtained that with respect to color is complementary to the dominant color and thus a color reproduction is obtained in the end effect that is falsified with respect to the original. Practical experience has shown that the number of satisfactory copies of correctly exposed film frame originals that, however, have dominant colors is much higher when no complete compensation to neutral gray is carried out but a certain degree of undercompensation is maintained.

The light measuring apparatus described in the indicated U.S. patent as well as other known measuring devices of this type are not suitable for a filter selection while maintaining a defined degree of undercompensation because by means of them the filtering is fixed in a manner that the copying light coming out of the film frame original always has the same ratio of color parts. This means that a difference in the color density between the respective original and the reference original is compensated completely by a corresponding change of the filtering and no reference value is provided for the carrying-out of a defined undercompensation.

DISCLOSURE OF THE INVENTION

The objective of the invention consists of providing a measuring device of the initially mentioned type by means of which, in a simple manner, the color composition of the copying light in a photographic enlarging or copying apparatus can be selected in such a way that a defined degree of undercompensation in the color exposure is achieved. This objective, according to the invention, is achieved by the characteristics of the characterizing part of claim 1 according to which the color ratio on the basis of measuring signals is determined by the measuring light coming out of the film frame original as well as entering into the film frame original that is influenced only by the filter adjustment and not by the original.

As a result of the special linking of measuring signals of the copying light before and after the flow through the picture original to be copied, it is achieved that a change of the filter setting has an effect on the measured-value indication that is superproportional to the effect caused by the same filter change on the copying material at the copying level. Therefore, by means of the measuring device according to the invention, using the same method of operation as by means of the conventional filter selecting apparatuses, an only partial color compensation is carried out; i.e., a filter selection takes place with an undercompensation.

In an embodiment of the measuring device according to the invention that is especially advantageous for practical application, the measuring indication that is consequential for the filter adjustment is derived from the product of the measuring signals formed in front of and behind the film frame original in each basic color. As a result, a 50% undercompensation is obtained which according to experiences brings satisfactory results for a wide selection of different film frame originals.

The measuring cells that produce the individual measuring signals are advantageously divided into two groups, each group containing red-, green- and blue-sensitized photocells, and one being housed in a movable measuring probe and the other one on the inside of a light-mixing shaft arranged above the film frame original.

Other advantageous developments of the device according to the invention are found in the subclaims in connection with the following description of a preferred embodiment shown in diagram form in one drawing.

SHORT DESCRIPTION OF THE DRAWING

FIG. 1 is a block diagram for showing the principle of operation of the measuring device according to the invention in connection with a diagrammatically shown enlarging apparatus.

PREFERRED EMBODIMENT OF THE INVENTION

In FIG. 1, the color head of a photographic enlarging apparatus in general has the reference number 1, said enlarging apparatus being shown only in diagram form and being limited to those parts that are necessary in order to understand the measuring principle. A light source 2 having a reflector 3 projects light on the light entry opening 4 of a light mixing shaft 5, the light exit opening 6 of which is covered by a diffusing screen 7. Three color filters 8, 9 and 10 in the complementary colors cyan, magenta and yellow individually, via driving elements 11, 12 and 13, can be partially introduced into the path of the rays and cover a selectable part of the ray cross-section so that this part of the light is colored. The part of the beam of rays that is not affected by the filters and the colored part of the beam of rays are mixed in the light mixing shaft 5 so that light shines at the exit of the shaft that with respect to color is homogeneous and the color composition of which depends on the position of the filters inside the path of the rays. Diffuse light that is homogeneous with respect to color comes out of the light mixing shaft 5 having the diffusing screen 7 and shines through a film frame original 14 to be copied that, by means of an objective 15, is sharply imaged on the copying level 16.

The actual measuring device comprises a measuring probe 17 having a first group of measuring cells 18, 19 and 20 which, by means of color filters 21, 22 and 23 that are placed in front are sensitized in the colors, red, green and blue. A second group of measuring cells 24, 25, and 26 that are also sensitized by means of filters 28, 29 and 30 in the colors red, green and blue is stationarily arranged on the inside of the light mixing shaft 5 and receives the light that is homogeneous with respect to color making it reach the film frame original 14. Signal amplifiers 31 to 36 are connected to the measuring cells of both groups, the output signals of said signal amplifiers furnishing a measurement for the light intensity of the color component detected by the respective measuring cell in the respective measuring level. Measuring signals that are part of the same color component from both groups of measuring cells, after the amplification in the operation units 37, 38 and 39 are linked with one another— preferably multiplied with one another—so that one result signal is created for each color that is a function of the light received by the measuring probe 17 as well as of the light existing on the inside of the light mixing shaft above the film frame original. In a further processing step, ratios of the color components with respect to one another are formed from the signals at the outputs of the operation units 37, 38 and 39. In particular, signals resulting from the color components green and blue are supplied to divide circuits 40 and 41 at which also the signal corresponding to the red color component is applied so that the output signals of the divide circuit express the ratio of the green and blue color component to the red color component. Both ratio signals, via controllable amplifiers 42, 43, are supplied to an indicating device that preferably comprises indicating instruments 44, 45 with a zero point in the center at which the difference is indicated between the respective applied measuring signal and a fixed value $U_{ref}$. The amplification control of the amplifiers 42 and 43, in a known manner, is achieved by means of adjustable potentiometers 46, 47 in the regenerative branch of the amplifiers. By means of the potentiometers 46, 47, in one calibrating step, the indication of the instruments 44, 45 with respect to the reference original can be adjusted to a fixed reference value, for example, to zero.

The application of the measuring device according to the invention is essentially the same as that using conventional filter selecting apparatuses. In a preceding calibrating step, the indication of the instruments 44, 45 with respect to a reference original and the filtering adapted to said reference original by means of the potentiometers 46, 47 is adjusted to the reference value, such as zero. For the filter selection for a film frame original to be copied, the measuring probe of the already calibrated measuring device is exposed to the copying light coming out of the film frame original and a possible deviation from the color balance of the reference original indicated by the indicating instruments is compensated by a corresponding adjustment of the filters. In practice, an operator therefore adjusts the filters at the color head of the enlarging apparatus by means of the filter drives until the indicating instruments are again at zero.

It is easy to understand how, by means of the described measuring device and the described method of operation, an undercompensation is created: a change of the light intensity that is created by a change of filtering is recorded by both groups of measuring cells in front of and behind the film frame original, whereas a difference in the density of one film frame original as compared to another one is perceived only by the measuring cells in the measuring probe. In the case that in the operation units 37, 38 and 39 a multiplication takes place of the signals coming from both groups of measuring cells, the measuring indication with respect to intensity changes caused by the filtering is therefore a square function and with respect to those caused by differences in the density of the original, is a linear function. Taking into account the logarithmic relationship between the filter density and density of the original, on the one hand, and the intensity of the transmitted light, on the other hand, it follows that a deviation of the measuring indication from the zero point because of a certain change of density $\Delta D$ of a film frame original as compared to a reference original is already compensated by a filter change in the opposite direction of a value of $\Delta D/2$. In other words, a density difference of $\Delta D$ in the original in the case of a constant measuring value indication, results in a change of filter density of a value of $-\Delta/2$; this is a 50% undercompensation. An expert can easily understand that in the case of a combination of the measuring signals from both groups of measuring cells to a different function that to the product, different degrees of undercompensation can be obtained. Instead of the product formation, the logarithmic values of the individual measuring signals or modified values of them can, for example, be summed up.

The measuring device according to the invention and its application in the above text is described in reference to a lighting arrangement in which the coloring of the copying light takes place by the corresponding color filtering of the light of an essentially white light source. However, it can also be applied to a lighting arrangement in which separate color light sources are provided for each of the three basic colors and the color composition of the overall light is determined by the ratio of the light intensities of the individual light sources with respect to one another. In this case, the color composition of the copying light, instead of by the filtering of one single white beam of light, is influenced by the corresponding control of the individual light sources.

I claim:

1. A measuring device for selecting the color composition of the copying light when copying a film frame original in a photographic enlarging or copying apparatus, said measuring device comprising in combination:
   a. a first group of measuring cell means for selectively measuring the copying light intensity in the basic colors red, green and blue before said copying light passes through the film frame original, and providing a first set of red, green and blue measuring signals determined by the intensity of the colors red, green and blue, respectively, detected by said first group of measuring cell means;
   b. a second group of measuring cell means for selectively measuring the copying light intensity in the basic colors red, green and blue after said copying light passes through the film frame original, and providing a second set of red, green and blue measuring signals determined by the intensity of the colors red, green and blue, respectively, detected by said second group of measuring cells;
   c. operating means coupled to said first and second groups of measuring cell means and responsive to said first and second groups of measuring signals for providing a set of red, green and blue result signals, the red result signal being a combined function of the first red measuring signal and the second red measuring signal, the green result signal being a combined function of the first green measuring signal and the second green measuring signal, and the blue result being a combined function of the first blue measuring signal and the second blue measuring signal;
   d. ratio means coupled to said operating means and responsive to the red, green and blue result signals for forming ratio signals corresponding to the ratios of the red, green and blue result signals with respect to one another; and
   e. comparing means coupled to said ratio means and responsive to the ratio signals for comparing the ratio signals with preset reference values obtained from a reference original and indicating any deviation therefrom.

2. A measuring device as recited by claim 1 wherein said operating means provides the red result signal as the mathematical product of the first red measuring signal and the second red measuring signal, provides the green result signal as the mathematical product of the first green measuring signal and the second green measuring signal, and provides the blue result signal as the mathematical product of the first blue measuring signal and the second blue measuring signal.

3. A measuring device as recited by claim 1 wherein said operating means includes means for forming a first set of red, green and blue logarithm signals corresponding to the logarithm of the first set of red, green and blue measuring signals, respectively, and means for forming a second set of red, green and blue logarithm signals corresponding to the logarithm of the second set of red, green and blue measuring signals, respectively, and summing means for summing said first and second sets of logarithm color signals to provide said red, green and blue result signals, respectively, the red result signal being the sum of the first and second red logarithm signals, the green result signal being the sum of the first and second green logarithm signals, and the blue result signal being the sum of the first and second blue logarithm signals.

4. A measuring device according to claim 1, wherein said second group of measuring cell means is housed in a movable measuring probe.

5. A measuring device according to claim 1, wherein said first group of measuring cell means is arranged on the inside of a light mixing shaft that guides the copying light onto the film frame original.

* * * * *